United States Patent
Geirhofer et al.

(10) Patent No.: US 9,503,924 B2
(45) Date of Patent: Nov. 22, 2016

(54) INTERPOLATION-BASED CHANNEL STATE INFORMATION (CSI) ENHANCEMENTS IN LONG-TERM EVOLUTION (LTE)

(71) Applicant: QUALCOMM Incorporated, San Diego, CA (US)

(72) Inventors: Stefan Geirhofer, Brooklyn, NY (US); Peter Gaal, San Diego, CA (US); Naga Bhushan, San Diego, CA (US); Alan Barbieri, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 172 days.

(21) Appl. No.: 14/155,661

(22) Filed: Jan. 15, 2014

(65) Prior Publication Data

US 2014/0204782 A1 Jul. 24, 2014

Related U.S. Application Data

(60) Provisional application No. 61/754,135, filed on Jan. 18, 2013.

(51) Int. Cl.
*H04L 1/00* (2006.01)
*H04W 4/00* (2009.01)
(Continued)

(52) U.S. Cl.
CPC ............ *H04W 24/10* (2013.01); *H04B 7/024* (2013.01); *H04B 7/066* (2013.01); *H04B 7/0619* (2013.01); *H04L 1/0023* (2013.01); *H04B 7/0417* (2013.01); *H04B 7/0639* (2013.01); *H04L 1/0026* (2013.01); *H04L 1/0032* (2013.01); *H04L 5/0091* (2013.01)

(58) Field of Classification Search
CPC ... H04W 24/10; H04B 7/0619; H04B 7/066; H04B 7/024; H04B 7/0417; H04B 7/0639; H04L 1/0023; H04L 5/0091; H04L 1/0026; H04L 1/0032
See application file for complete search history.

(56) References Cited

U.S. PATENT DOCUMENTS 8,743,785 B2 * 6/2014 Qu ................ H04W 52/244
  370/328
2009/0011767 A1 * 1/2009 Malladi ............. H04B 1/713
  455/450

(Continued)

OTHER PUBLICATIONS

International Search Report and Written Opinion—PCT/US2014/011770—ISA/EPO—Mar. 25, 2014.

(Continued)

*Primary Examiner* — Kiet Tang
(74) *Attorney, Agent, or Firm* — Patterson & Sheridan, L.L.P.

(57) ABSTRACT

According to example embodiments, a method for wireless communications by a user equipment (UE) is included. The method generally includes performing channel estimation at a plurality of frequency locations based on reference signals (RS) transmitted from at least one transmission point, computing at least one channel feedback metric for each frequency location, and transmitting the channel feedback metrics to the transmission point. According to certain aspects, a method for wireless communications by a base station (BS) is provided. The BS may receive channel feedback metrics from a UE, calculated at a plurality of frequency locations based on RSs transmitted from the BS. The BS may perform interpolation to determine values for channel feedback metrics for frequency locations between frequency locations of the received channel feedback metrics.

30 Claims, 10 Drawing Sheets

(51) Int. Cl.
*H04J 11/00* (2006.01)
*H04W 72/00* (2009.01)
*H04B 3/36* (2006.01)
*H04L 27/28* (2006.01)
*H04W 24/10* (2009.01)
*H04B 7/02* (2006.01)
*H04L 5/00* (2006.01)
*H04B 7/04* (2006.01)
*H04B 7/06* (2006.01)

(56) References Cited

U.S. PATENT DOCUMENTS

| | | | | |
|---|---|---|---|---|
| 2009/0245090 | A1* | 10/2009 | Budianu | H04B 1/76 370/210 |
| 2010/0118817 | A1* | 5/2010 | Damnjanovic | H04L 1/0026 370/329 |
| 2010/0254469 | A1* | 10/2010 | Luschi | H04L 1/20 375/260 |
| 2010/0284447 | A1* | 11/2010 | Gore | H04B 7/15585 375/211 |
| 2012/0033575 | A1* | 2/2012 | Zhang | H04B 7/0417 370/252 |
| 2012/0113794 | A1 | 5/2012 | Roman et al. | |
| 2012/0188976 | A1* | 7/2012 | Kim | H04L 1/0025 370/329 |
| 2012/0236752 | A1 | 9/2012 | Hu et al. | |
| 2013/0039291 | A1 | 2/2013 | Blankenship et al. | |
| 2013/0088984 | A1* | 4/2013 | Lee | H04L 5/0053 370/252 |
| 2013/0142071 | A1* | 6/2013 | Liu | H04B 7/024 370/252 |
| 2013/0235911 | A1 | 9/2013 | Geirhofer et al. | |
| 2013/0301434 | A1* | 11/2013 | Krishnamurthy | H04L 1/0026 370/252 |
| 2015/0155993 | A1* | 6/2015 | Berggren | H04L 5/0023 370/330 |

OTHER PUBLICATIONS

Qualcomm Europe: "Multiple Description Coding for Spatial Feedback Payload Reduction", 3GPP Draft: R1-090866. 3rd Generation Partnership Project (3GPP), Mobile Competence Centre ; 650, Route Des Lucioles ; F-06921 Sophia-Antipolis Cedex ; France, no, Athens, Greece: Feb. 3, 2009, XP050318715, [Retrieved on Feb. 3, 2009] the whole document.

Qualcomm Europe, "Comparison between MDC and MLC feedback encoding techniques", 3GPP Draft, R1-093112 Comparison MDC MLC, 3rd Generation Partnership Project (3GPP), Mobile Competence Centre , 650, Route Des Lucioles, F-06921 Sophia-Antipolis Cedex , France, no. Shenzen, China, Aug. 19, 2009, XP050351484.

Qualcomm Europe: "UE-RS Patterns for LTE-A", 3GPP Draft; R1-093105, no. Shenzhen, China; Aug. 19, 2009, XP050351482, France [retrieved on Aug. 19, 2009].

Qualcomm Incorporated: "Issues from real-life DL MIMO deployments" 3GPP Draft; R1-112549 Issues From Real Life DL MIMO Deployments, 3rd Generation Partnership Project (3GPP), Mobile Competence Centre ; 650, Route Des Lucioles, F-06921 Sophia-Antipolis Cedex; France, vol. RAN WG1, no, Athens, Greece; Aug. 22, 2011, Aug. 16, 2011 XP050537626, [retrieved on Aug. 16, 2011] the whole document.

Qualcomm Incorporated: "CSI feedback enhancements", 3GPP Draft; R1-112550 CSI Feedback Enhancements, 3rd Generation Partnership. Project (3GPP), Mobile Competence Centre ; 650, Route Des Lucioles ; F-06921 Sophia-Antipoliss Cedex ; France, vol. RAN WGI, no. Athens, Greece; Aug. 22, 2011, Aug. 17, 2011, XP050537779 [retrieved on Aug. 17, 2011] the whole document.

* cited by examiner

INTERPOLATION-BASED CHANNEL STATE INFORMATION (CSI) ENHANCEMENTS IN LONG-TERM EVOLUTION (LTE)

CLAIM OF PRIORITY UNDER 35 U.S.C. §119

This application claims benefit of U.S. Provisional Patent Application Ser. No. 61/754,135, filed Jan. 18, 2013, which is herein incorporated by reference in its entirety.

BACKGROUND

I. Field

Certain aspects of the disclosure generally relate to wireless communications and, more particularly, to techniques for interpolation-based channel state information (CSI) enhancements in long-term evolution (LTE).

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Certain aspects of the present disclosure provide techniques, corresponding apparatus, and program products, for interpolation-based channel state information (CSI) enhancements in long-term evolution (LTE).

Certain aspects provide a method for wireless communications by a user equipment (UE). The method generally includes performing channel estimation at a plurality of frequency locations based on reference signals (RSs) transmitted from at least one transmission point, computing at least one channel feedback metric for each frequency location, and transmitting the channel feedback metrics to the at least one transmission point.

Certain aspects provide a method for wireless communications by a base station (BS). The method generally includes receiving channel feedback metrics from a UE, calculated at a plurality of frequency locations based on RSs transmitted from the BS and performing interpolation to determine values for channel feedback metrics for frequency locations between frequency locations of the received channel feedback metrics.

Certain aspects provide a method for wireless communications by a UE. The method generally includes performing channel estimation at a plurality of frequency locations based on demodulation reference signals (DM-RSs) transmitted from at least one transmission point, performing interpolation to determine values for channel estimates for frequency locations between the plurality of frequency locations, and performing demodulation based, at least in part, on the interpolated values.

Certain aspects provide an apparatus for wireless communications by a UE. The apparatus generally includes means for performing channel estimation at a plurality of frequency locations based on RSs transmitted from at least one transmission point, means for computing at least one channel feedback metric for each frequency location, and means for transmitting the channel feedback metrics to the at least one transmission point.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
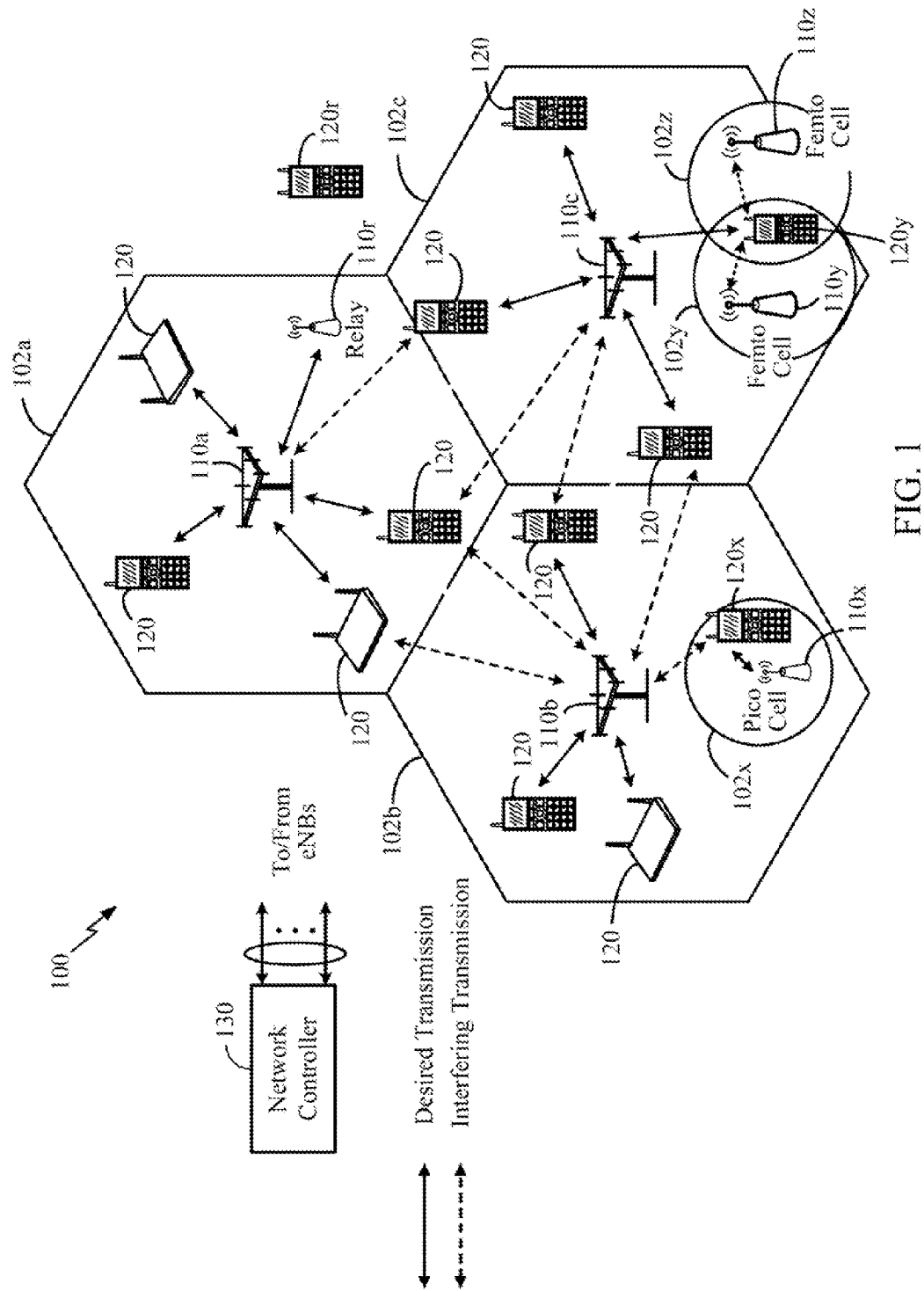
FIG. 1 is a block diagram conceptually illustrating an example of a wireless communications network, in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (i.e., a macro base station). An eNB for a pico cell may be referred to as a pico eNB (i.e., a pico base station). An eNB for a femto cell may be referred to as a femto eNB (i.e., a femto base station) or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For certain aspects, the UE may comprise an LTE Release 10 UE.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
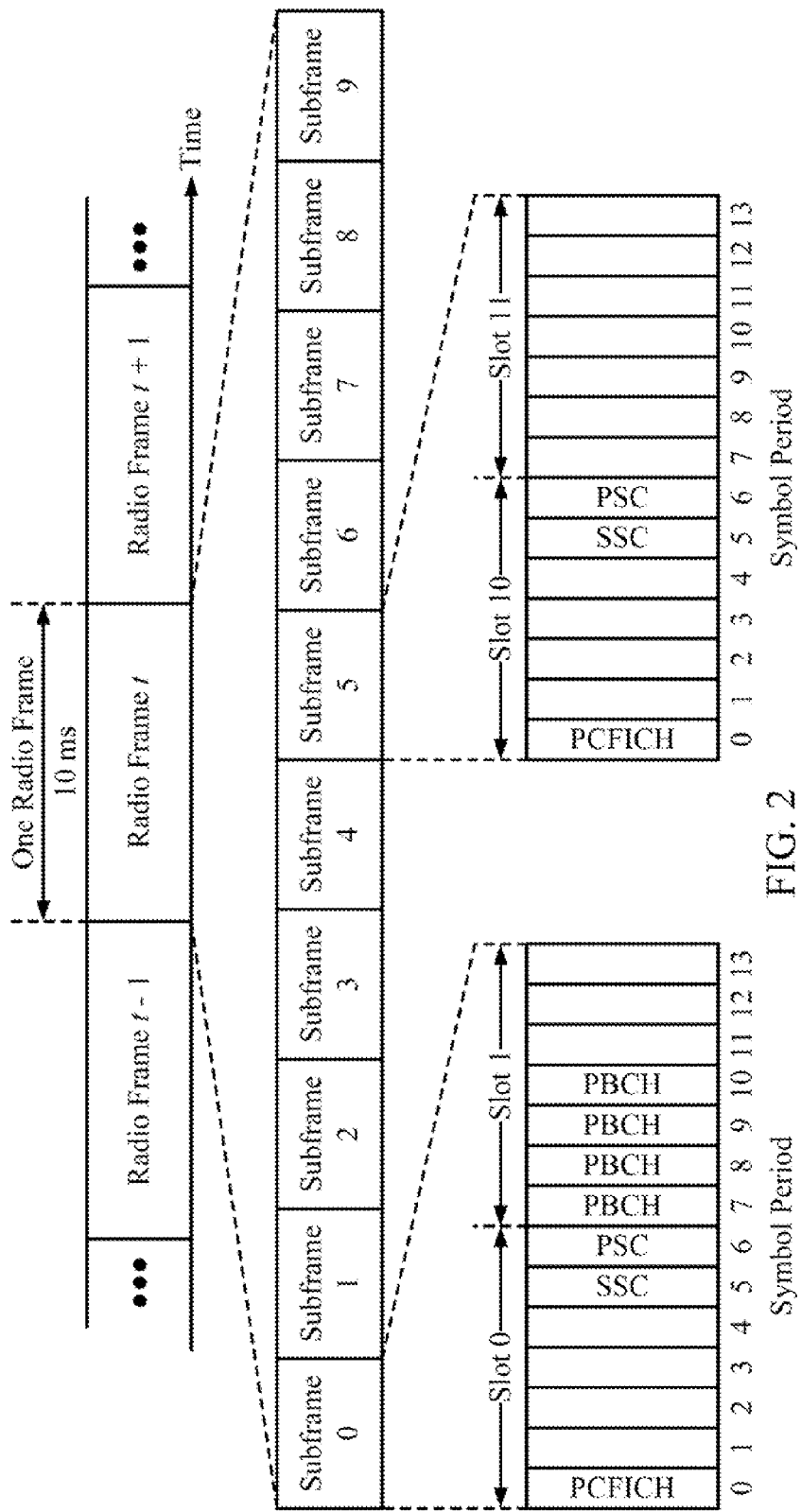
FIG. 2 is a block diagram conceptually illustrating an example of a frame structure in a wireless communications network, in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
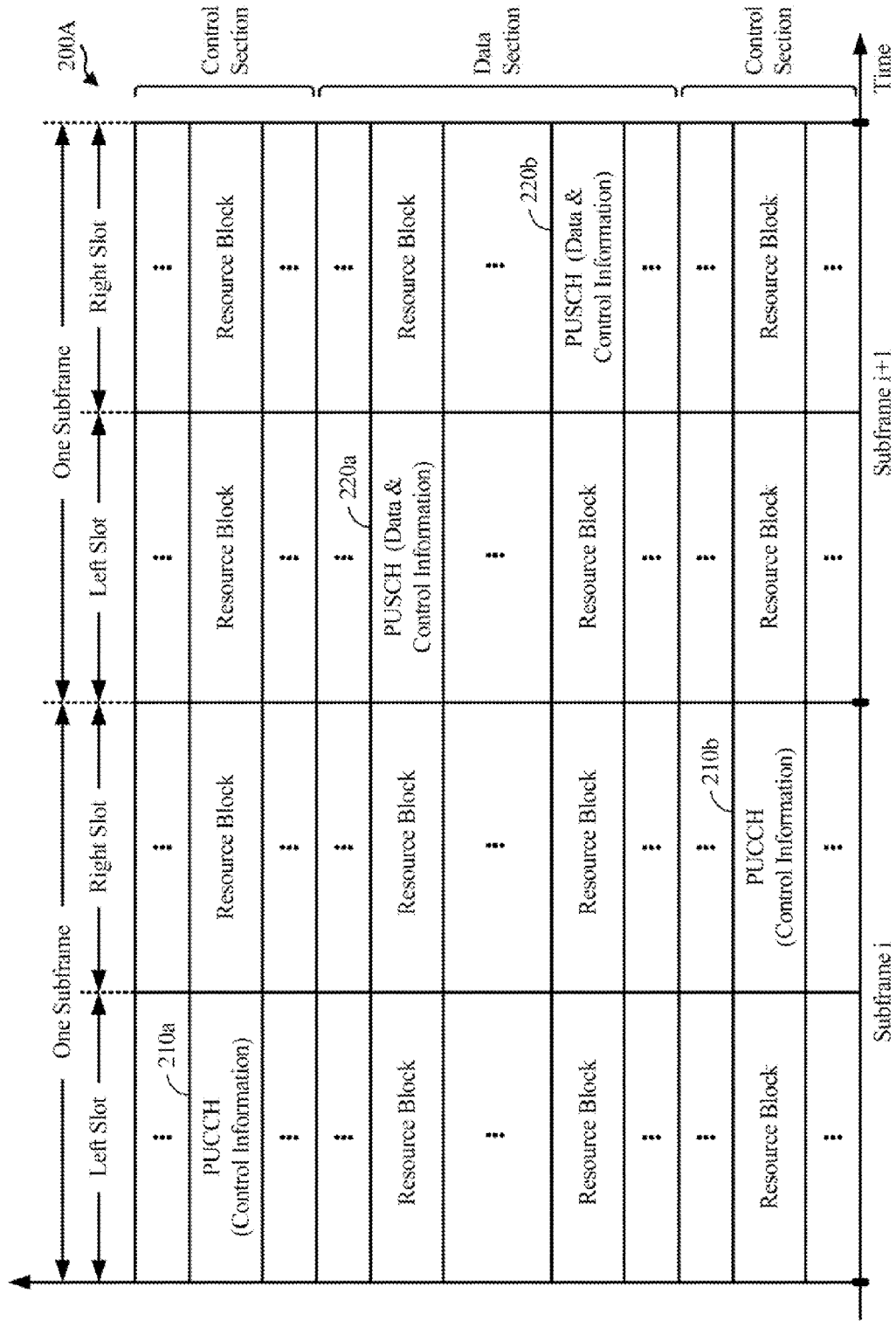
FIG. 2A shows an example format for the uplink in Long Term Evolution (LTE), in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

Figure 3:
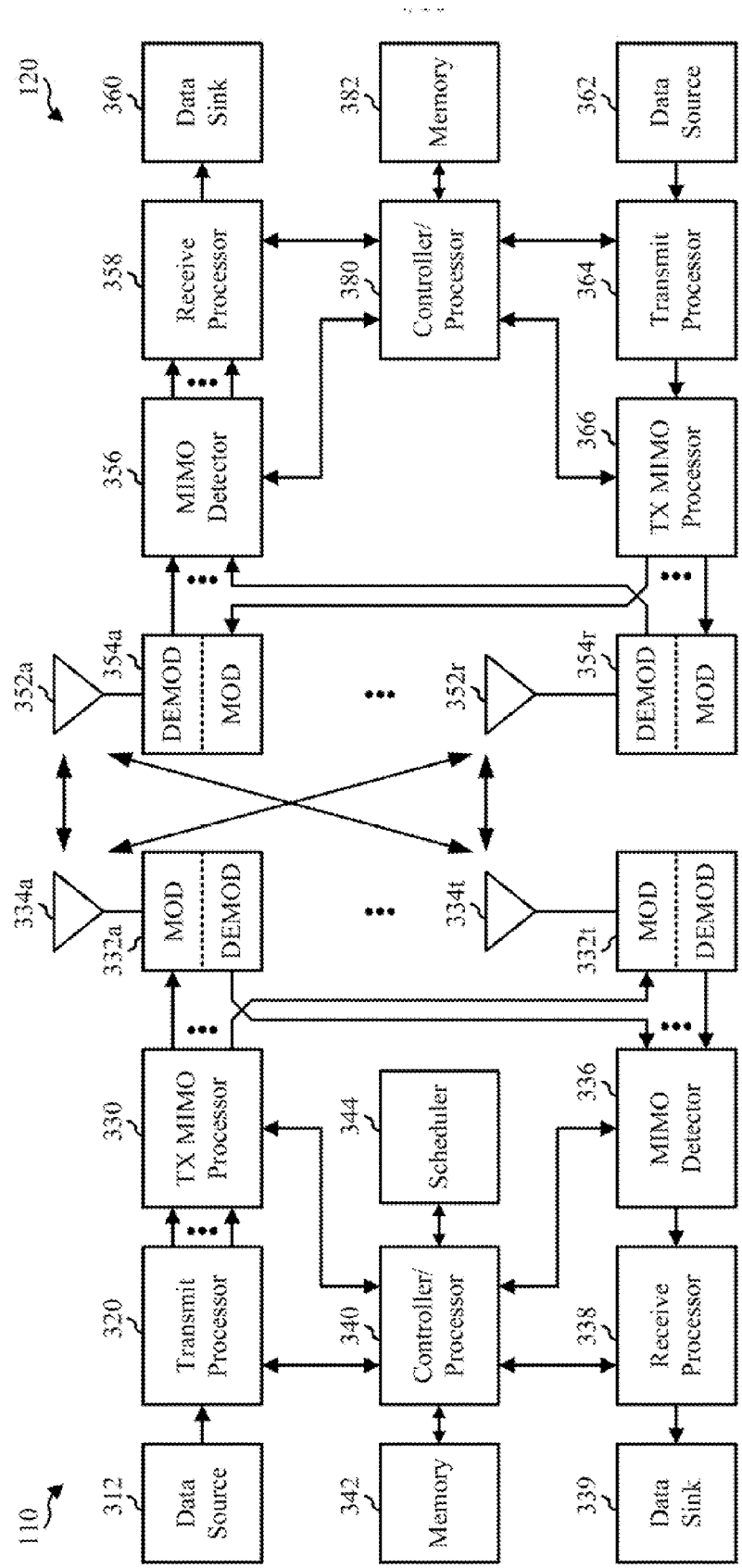
FIG. 3 shows a block diagram conceptually illustrating an example of a Node B in communication with a user equipment device (UE) in a wireless communications network, in accordance with certain aspects of the present disclosure.

FIG. 3 is a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and the UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The controller/processor 340, receive processor 338, and/or other processors and modules at the eNB 110 may perform or direct operations 800 in FIG. 8 and/or other processes for the techniques described herein. The memories 342 and 382 may store data and program codes for the eNB 110 and the UE 120, respectively. A scheduler 344 may schedule UEs for data transmission on the downlink and/or uplink.

Interpolation-Based CSI Enhancements in LTE

Accurate channel state information (CSI) is a prerequisite for performing interference nulling at the network. To achieve good performance, it is beneficial to refine the CSI feedback accuracy supported by current cellular systems (e.g., long term evolution advanced (LTE-A). However, it is desirable to balance feedback refinements with their corresponding increase in uplink feedback overhead. Similarly, precoder granularity for demodulation may be fixed to enable better channel estimation at the user equipment (UE). In the context of interference nulling, however, it may be desirable to avoid fixed precoder granularity for improving nulling capability.

In certain systems (e.g., Release-11 long term evolution (LTE)), coordinated multipoint (CoMP) in LTE targets multiple CoMP schemes including coordinated scheduling/coordinated beamforming (CS/CB), dynamic point selection (DPS), and non-coherent (e.g. transparent) joint transmission (JT).

In Release-11, various CoMP deployment scenarios may be employed. In a first scenario, CoMP may be employed homogeneously across cells of the same macro site. In a second scenario, CoMP may be employed homogeneously across three neighboring macro sites. In a third scenario, CoMP may be employed heterogeneously across a macro cell and the associated pico cells (e.g., remote radio heads (RRHs)). In the third scenario, the macro cell and RRHs may be configured with different cell IDs. In a fourth scenario, CoMP may be employed heterogeneously across a macro and associated pico cells as in the third scenario, but in this scenario the macro cell and RRHs may be configured with the same cell ID.

For JT schemes, multiple transmission points may schedule multiple UEs. Interference nulling may be desired to suppress interference across the multiple streams. According to certain aspects, however, CSI feedback optimized for DPS may not be sufficiently precise to enable accurate interference nulling.

Figure 4:
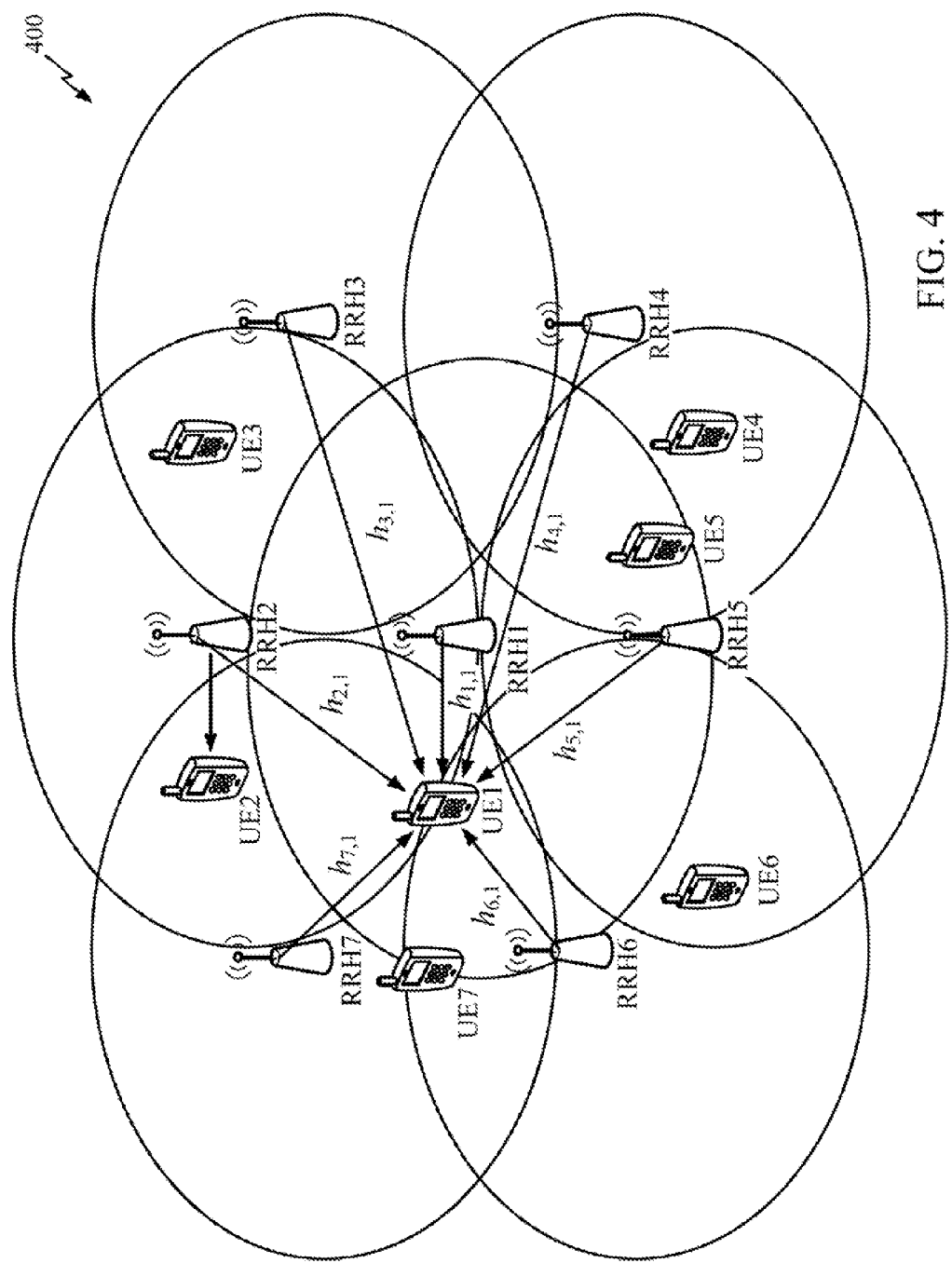
FIG. 4 illustrates an example coordinated multipoint (CoMP) cluster with joint transmissions from a large number of cells, in accordance with certain aspects of the present disclosure.

FIG. 4 illustrates an example CoMP cluster 400, in accordance with certain aspects of the present disclosure. Whereas in Rel-11, joint transmission focused on coordination among only a few cells, as shown in FIG. 4, in some multi-point equalization (MPE) schemes there may be joint transmission from a large number of cells. As seen in FIG. 4, for example, UE1 receives transmission from multiple RRHs, RRH1-RRH7. UE1 may perform interference nulling within the CoMP cluster 400.

Interference nulling may preserve scheduling opportunities as each transmission point (e.g., RRH1-RRH7) continues to schedule multiple UEs (e.g., UE1-UE7). Interference nulling may suppress interference across streams.

Typically, CSI feedback is primarily optimized for DPS and is not sufficiently accurate to enable accurate interference nulling. It is desirable to refine CSI feedback accuracy supported by cellular systems, such as LTE, in order to achieve good performance. Accurate CSI feedback is a prerequisite for performing interference nulling at the network. However, feedback refinements may increase uplink feedback overhead.

Various precoding schemes exist. Zero-Forcing precoding attempts to invert the system-wide channel matrix. Signal-to-leakage ratio optimization attempts to balance between signal combining and interference nulling. Interference nulling is sensitive to CSI error which may be introduced by the frequency selective channel. One solution is to shrink the subband size to at least one physical resource block (PRB) or less. However, it may be desirable to avoid shrinking the subband size and to avoid averaging at the UE side.

LTE utilizes an implicit rank indicator/precoding matrix indicator/channel quality indicator (RI/PMI/CQI) feedback framework. CSI feedback conveys the preferred transmission rank, precoder, and packet format from the UE to the network. The UE conveys the preferred transmission rank with the RI, the preferred precoding matrix with the PMI, which is conditioned on the RI, and the preferred packet format with the CQI, which is conditioned on the RI and PMI.

RI/PMI/CQI feedback reflects average channel conditions over a portion of the bandwidth. Some metrics, such as RI and PMI, may be computed to reflect the average channel conditions across the system bandwidth (e.g., wideband RI/PMI). Some metrics, such as PMI and CQI, may be computed per subband. However, the subband granularity is still fairly coarse (e.g., 6 PRBs). Averaging of CSI information may be undesirable for interference nulling. Averaging CSI information limits the network's ability to interpolate CSI feedback by the UE and limits the UE's ability to interpolate the precoder for demodulation.

Precoding granularity is currently fixed to multiple PRBs (e.g., one PRG) when bundling is enabled. As noted above, to provide accurate feedback, the subband granularity may be enhanced by shrinking the subband size, however, this solution leads to additional overhead. For demodulation reference signal (DM-RS) based demodulation, the UE may assume PRB bundling if configured with PMI/RI feedback. The UE may also assume that the precoder remains fixed over a group of PRBs (PRG). The UE may exploit this assumption to enhance channel estimation by using the reference signals contained across PRBs of the same PRG. However, although benefiting channel estimation accuracy, bundling may degrade performance of interference nulling because it requires the network to maintain the same precoding vector across PRBs of the same PRG and the precoder may only be selected with coarse granularity.

Currently, UE performs wideband or subband averaging of CSI information which makes interpolation difficult.

Therefore, it is desirable to enhance CSI feedback accuracy, while avoiding large increases of CSI overhead, for example increases resulting from increasing subband granularity, and to allow for UE-side interpolation when demodulation is performed.

Aspects of the present disclosure provide techniques for interpolation-based interference nulling, allowing the UE to perform CSI feedback at designated frequency locations in order to enable interpolation at the network side. Aspects of the present disclosure also provide techniques for performing precoder interpolation for demodulation. In order to allow for interpolation at the UE side when demodulation is performed, certain aspects provide for informing the UE of when it is allowed to perform interpolation (e.g., when bundling should not be assumed). Certain aspects further provide techniques for performing interpolation.

According to certain aspects, the UE may perform channel estimation at predefined frequency locations and provide CSI feedback to the network for the predefined frequency locations. The network may perform interpolation using the provided CSI feedback to recover CSI in between the predefined frequency locations.

According to certain aspects, the UE estimates the channel for demodulation at predefined frequency locations and the UE interpolates the channel and assumes the interpolated channel for demodulation on each tone (e.g., the UE does not make any bundling assumptions).

Figure 5:
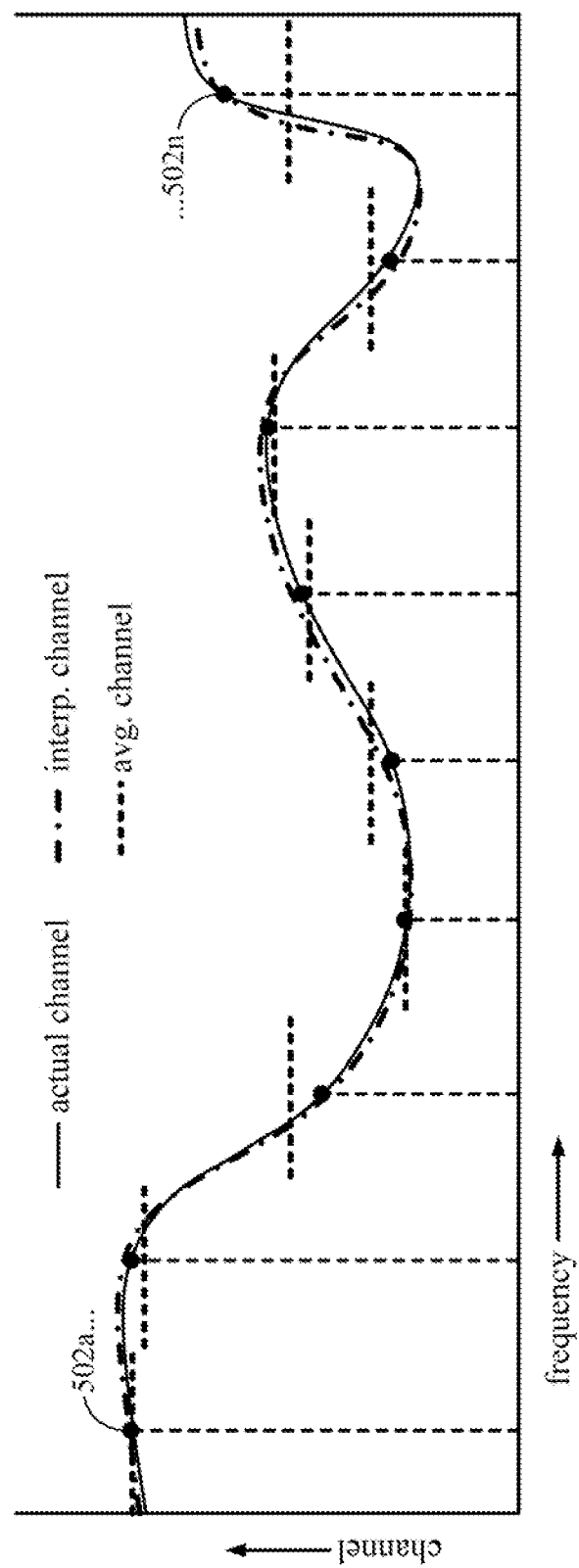
FIG. 5 illustrates example interpolation-based channel state information (CSI) feedback for demodulation at predefined frequency locations, in accordance with certain aspects of the present disclosure.

FIG. 5 illustrates example interpolation-based CSI feedback for demodulation at predefined frequency locations, in accordance with certain aspects of the present disclosure. As seen in FIG. 5, the UE may estimate the channel for demodulation at predefined frequency locations 502a . . . 502n. The UE may interpolate the channel and assume the interpolated channel for demodulation on each tone (e.g., it does not make any bundling assumptions).

For MPE, CSI feedback may convey the channel to multiple transmission points. CSI feedback may be intra-point feedback or inter-point feedback. Intra-point feedback captures the CSI information from the UE to a specific transmission point. Inter-point feedback captures the amplitude/phase relation between the CSI feedback instances corresponding to a pair of transmission points. Inter-point feedback may allow coherent transmission to the UE and is currently not supported in LTE. Interpolation-based feedback techniques may be applied to both intra-point and inter-point feedback.

According to certain aspects, the UE may select the frequency locations 502a . . . 502n for which it provides feedback, as opposed to using pre-defined frequency locations. This may allow improved interpolation accuracy at the network, for example, by selecting locations based on the actual channel realization.

For certain embodiments, for intra-point CSI feedback, the UE may estimate the channel for a transmission point based on a reference signal (e.g., CSI-RS in LTE) to obtain estimates of the channel matrix H from the transmission point to the UE. As mentioned above, the estimates may be obtained for predefined frequency locations (e.g., frequency locations 502a . . . 502n) rather than averaging across a range of frequencies. For example, frequency locations may correspond to the locations of the reference signal REs in frequency (e.g., CSI-RS RE locations). Filtering across multiple frequency locations may be used to remove estimation errors; however, the final CSI estimates should be representative of each frequency location and not of some average across several frequency locations.

After performing channel estimations at the predefined frequency locations, the UE may then perform feedback computation for each frequency location. The feedback may be implicit, explicit, or element-wise. For implicit feedback, the UE may select PMI/CQI for each frequency location (RI may remain wideband). For explicit feedback, the UE may compute channel direction (CDI) for each frequency location. For certain embodiments, single value decomposition may be used to determine the channel directions. Alternatively, a receive vector r* may be determined per frequency location and the effective channel direction (e.g., multiple-input single-output (MISO) channel) may be determined as r*H. For certain embodiments, more than one CDI may be fed back to allow for rank>1 transmissions. For element-wise feedback, the UE may feed back the channel matrix per matrix element (e.g., without making a receive processing assumption).

After computing feedback for each frequency location, the UE may then feed back CSI information to the network. According to certain aspects, quantization may be performed for the CSI information computed in the previous step. The feedback may then be reported to the network on physical uplink shared channel (PUSCH) or physical uplink control channel (PUCCH).

The network may then receive the CSI and perform interpolation. Interpolation may be performed in order to determine the CDI and/or PMI information on tones in between the frequency locations that were fed back.

According to certain aspects, a procedure similar to that for intra-point CSI feedback may be used for inter-point feedback. Inter-point feedback may comprise both inter-point amplitude and phase information. Amplitude feedback captures relative channel strengths of the transmission points—PMI/CDI only capture the channel direction. Phase feedback captures the phase offset between transmission points. For certain embodiments, inter-point feedback may be computed after the intra-point CSI information has been determined.

According to certain aspects, interpolation-based inter-point CSI feedback may be performed. Amplitude/phase information may be computed at the frequency locations used for intra-point feedback—also with no averaging. The amplitude/phase information may then be fed back to the network. The network may then interpolate the amplitude/phase information to determine the amplitude/phase information at tones in between the frequency locations (e.g., frequency locations 502a . . . 502n).

According to certain aspects, the frequency locations used for inter-point CSI feedback may be finer or coarser than the frequency locations used for intra-point CSI feedback to allow for overhead savings when inter-point CSI feedback is more or less frequency selective than intra-point CSI feedback. For certain embodiments, the frequency granularity (i.e., interpolation locations) may be configured or selected differently for each transmission point (i.e., feedback instance). Thus, overhead savings may be achieved as the feedback granularity may be tailored to the frequency selectivity of each transmission point. For certain embodiments, the frequency granularity may be configured by the network. Alternatively, the frequency granularity may be selected by the UE. The granularity of inter-point feedback may be selected independently for each pair of inter-point CSI feedback instances.

According to certain aspects, the frequency granularity may be selected not only as a function of frequency selectivity, but may also take into account the long-term channel strength of the cell. For example, strong cells should be reported with higher accuracy than weak cells. Thus, feedback may be scalable.

According to certain aspects, interpolation-based feedback may be periodic or aperiodic feedback. Periodic feedback may cycle over frequency locations (e.g., reporting different frequency locations different subframes). Aperiodic feedback may be comprising reporting the CSI of all frequency locations in one report on PUSCH.

According to certain aspects, in order to reduce the impact of channel estimation errors, filtering of the CSI estimates may be performed. The filtering may reduce the impact of measurement error by exploiting correlation among neighboring frequency locations. The filtering may be performed such that the filtered CSI estimate remains representative for that frequency location and not compromise the network's ability to perform interpolation. For certain embodiments, the filtering parameters may depend on the delay-spread/frequency-selectivity of the channel. For example, a less frequency-selective channel may allow for filtering across a wider range of frequency locations such as to reduce measurement noise, whereas a more frequency-selective channel may allow for less filtering because the channel may change across the frequency locations.

For certain embodiments, filtering parameters may be determined by the UE. The UE may determine the filtering parameters based, at least in part based, on signaling received from the network. Alternatively, the UE may determine filtering parameters based on longer term observations of the frequency selectivity of the channels.

Figure 6:
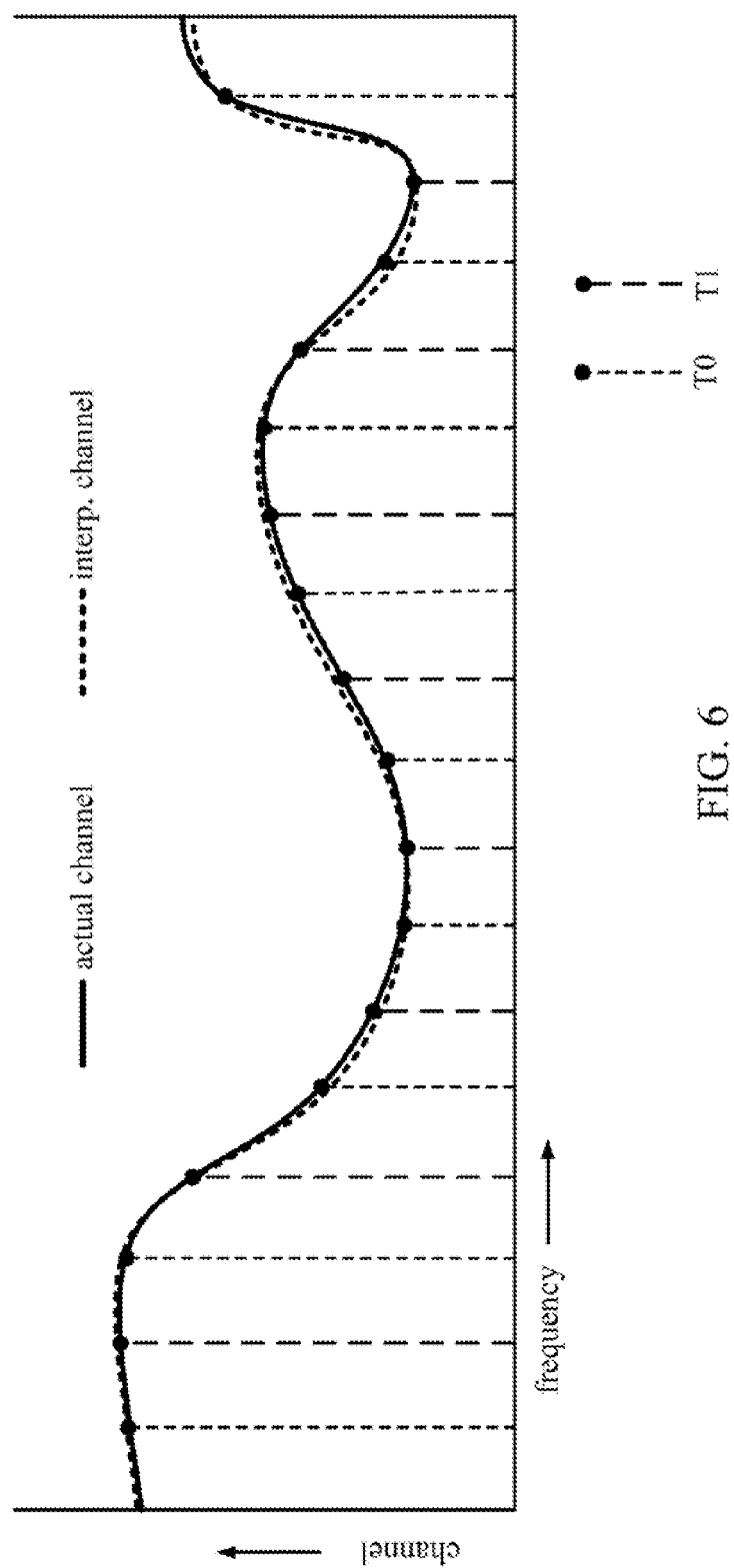
FIG. 6 illustrates example interpolation-based CSI feedback or demodulation frequency locations varying in time, in accordance with certain aspects of the present disclosure.

According to certain aspects, the frequency locations on which CSI feedback is performed may vary in time (e.g., subframe dependent). Varying the frequency locations over time may enhance the interpolation process. FIG. 6 illustrates example interpolation-based CSI feedback or demodulation frequency locations varying in time, in accordance with certain aspects of the present disclosure. As shown in FIG. 6, some lines correspond to feedback at time instance $T_0$ and the other lines correspond to feedback at time $T_1$. As shown, the frequency locations vary over time instances $T_0$ and $T_1$. This may allow interpolation across both frequency and time. Interpolation in time corresponds to interpolating across CSI information reported in different subframes. For example, more outdated reports should carry less weight in the interpolation procedure compared to more recent reports.

According to certain aspects, for implicit feedback, CSI may be computed based on channel and interference measurements. Averaging may be performed on a wideband/subband level. According to certain aspects, interpolation may not apply to interference measurements where there is no frequency correlation for interference. For MPE, interference may capture only interference from cells with which no coordination is performed. Interference estimation may be common across the transmission points for which feedback is provided—which may reflect uncoordinated interference. CQI for each transmission point may be provided and may be used for inter-point amplitude feedback. For example, the CQI level—which may represent channel strength relative to the common interference level—may reflect the amplitude relation between the transmission points. Interference estimation may continue to be performed on a wideband/subband level.

According to certain aspects, interpolation-based demodulation may be performed. PRB bundling typically requires the network to select one precoder per PRG when PMI/CQI feedback is configured. This may impair nulling gains because the precoder may not be adapted per PRB or per tone. For certain embodiments, performing interpolation-based CSI estimation at the receiver may avoid impact to nulling gains at the expense of some channel estimation loss due to the lack of PRB bundling.

For certain embodiments, DM-RS may be used for demodulation. DM-RS is a precoded reference signal. DM-RS may enable non-codebook based precoding. According to certain aspects, the UE may estimate the channel per DM-RS frequency location, without assuming bundling. The precoder may be assumed fixed across a single PRB. Alternatively, the precoder may change per subcarrier. In this case, the UE may perform estimation separately per DM-RS frequency location. According to certain aspects, filtering across multiple frequency locations may be used to suppress estimation errors; however, the final CSI estimates should be representative of each frequency location and not representative of an average across several frequency locations. In aspects, the UE may interpolate the channel estimates—which include precoding—and perform demodulation based on the interpolated values. The UE may assume that the transmission rank remains fixed across the system bandwidth.

According to certain aspects, various interpolation techniques may be performed. For certain embodiments, the UE may perform vector-based interpolation of channel directions. In this approach, the UE may avoid interpolation per vector element, instead, the UE may interpolate the direction of the channel directly (e.g., through geodesic interpolation). Vector-based interpolation of channel directions may be well suited for CSI feedback where channel directions consist of unit-norm vectors.

For certain embodiments, the UE may perform per-element interpolation for vectors or matrices by interpolating each element of the vector/matrix independently. Per-element interpolation may be well suited for interpolation-based CSI estimation for demodulation. In this case, the UE may interpolate the channel matrix—including precoding—for each combination of DM-RS antenna port and UE receive antenna, separately.

Figure 7:
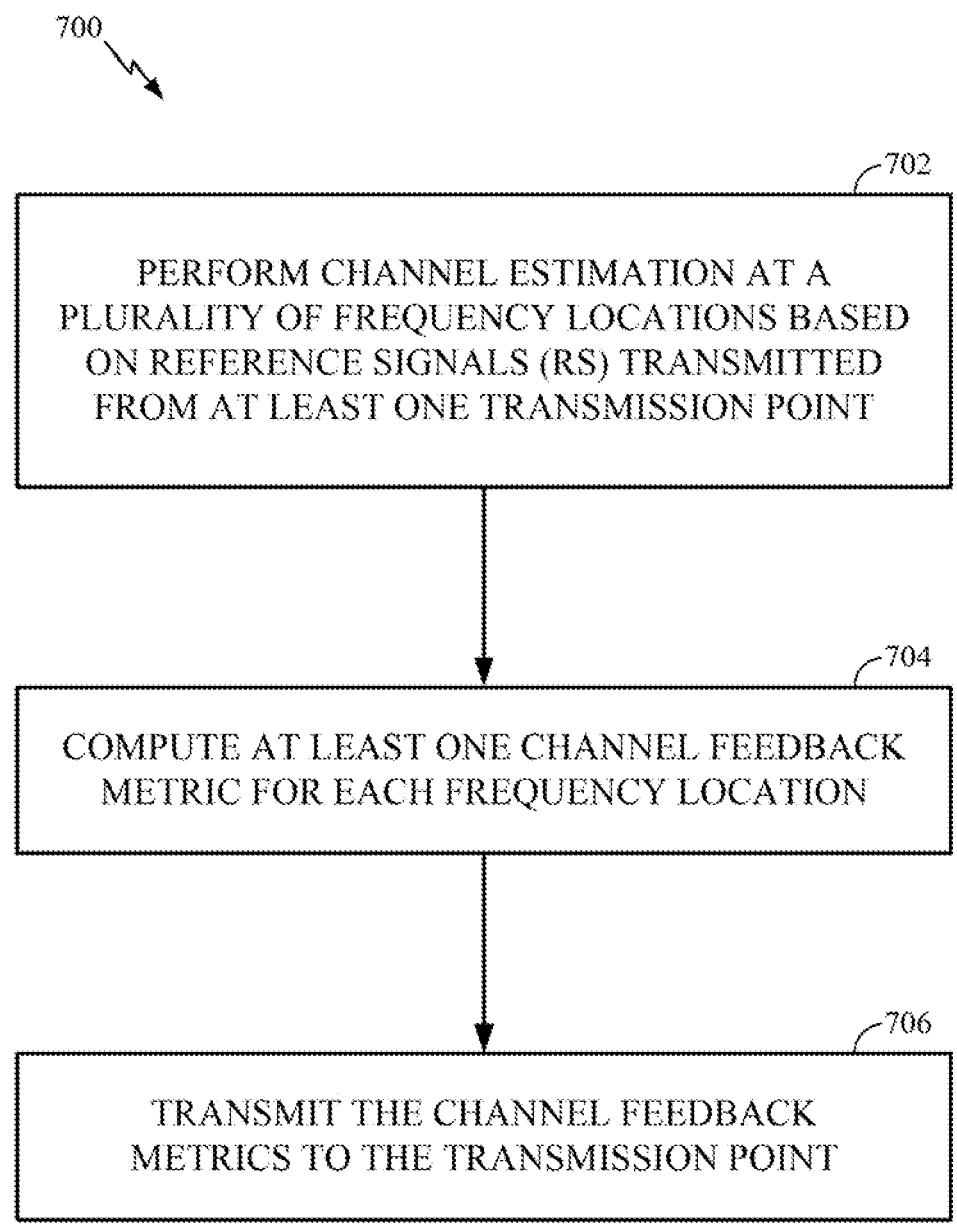
FIG. 7 illustrates example operations that may be performed, for example, by a UE, in accordance with aspects of the present disclosure.

FIG. 7 illustrates example operations 700 for wireless communications, in accordance with certain aspects of the present disclosure. The operations 700 may be performed, for example, by a UE (e.g., UE 120). The operations 700 may begin, at 702, by performing channel estimation at a plurality of frequency locations based on RSs transmitted from at least one transmission point. According to certain aspects, the frequency locations may correspond to REs used to transmit the RSs. For certain embodiments, the UE may receive signaling indicating a granularity of the frequency locations. Additionally, the UE may perform filtering to remove errors in the channel estimation.

At 704, the UE may compute at least one channel feedback metric for each frequency location. For example, the UE may compute channel matrix elements calculated as part of the channel estimation. As another example, the UE may compute a PMI or a CQI for each frequency location. As yet another example, the UE may compute a channel direction for each frequency location. According to certain aspects, the UE may compute inter-point amplitude and phase information.

And at 706, the UE may transmit the channel feedback metrics to the at least one transmission point. The method of claim 8, wherein the signaling indicates different granularities for different transmission points. According to certain aspects, the feedback may be provided periodically. For example, feedback for different frequency locations may be reported in different subframes. Alternatively, the feedback may be provided aperiodically. For example, feedback for all frequency locations may be provided in a single report.

Figure 8:
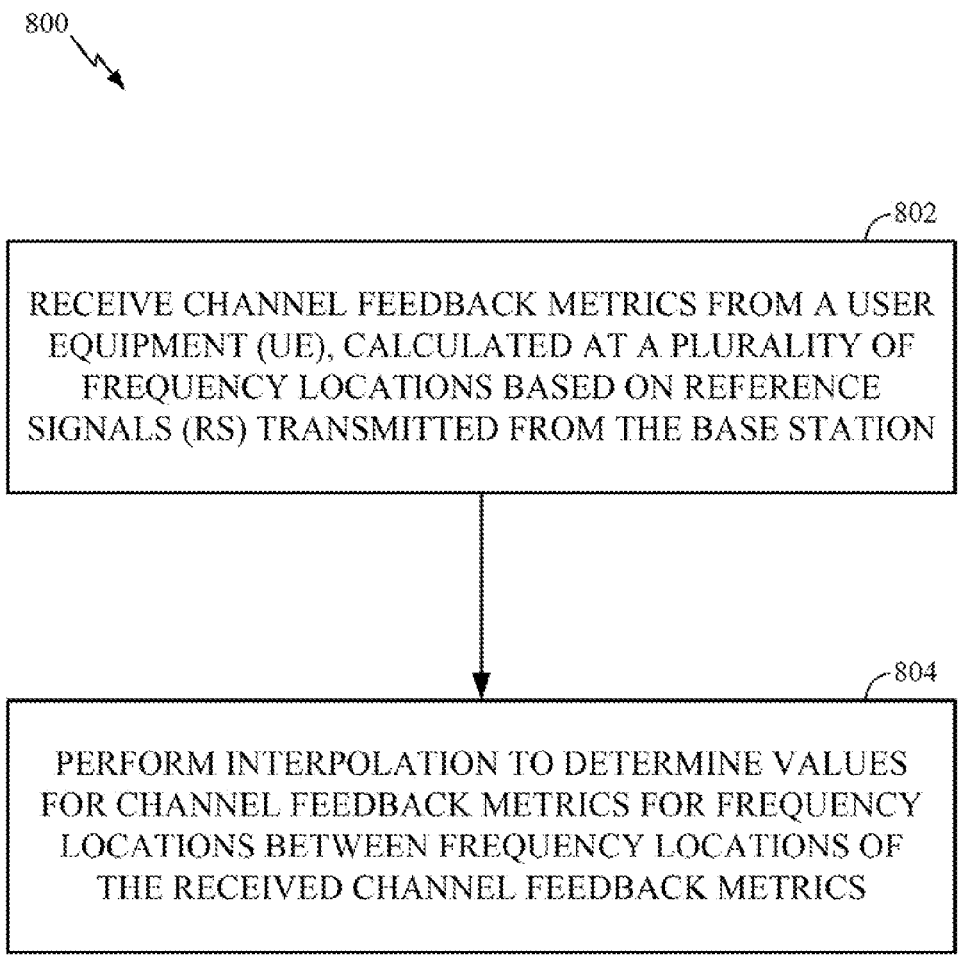
FIG. 8 illustrates example operations that may be performed, for example, by a base station (BS), in accordance with aspects of the present disclosure.

FIG. 8 illustrates example operations 800 for wireless communications, in accordance with certain aspects of the present disclosure. The operations 800 may be performed, for example, by a BS (e.g., BS 110). The operations 800 may begin, at 802, by receiving channel feedback metrics from a UE, calculated at a plurality of frequency location based on RSs transmitted from the BS. For example, the BS may receive a PMI or a CQI for each frequency location. Alternatively, the BS may receive a channel direction for each frequency location or channel matrix elements calculated by the UE as part of the channel estimation. The channel feedback metrics for each frequency location may be based, at least in part, on RSs transmitted from another BS.

For certain embodiments, the channel feedback metrics may be received periodically. For example, channel feedback metrics for different frequency locations may be reported in different subframes. For certain embodiments, the channel feedback metrics may be provided aperiodically. For example, feedback for all frequency locations may be provided in a single report. According to certain aspects, the frequency locations may correspond to REs used to transmit the RSs At 804, the BS may perform interpolation to determine values for channel feedback metrics for frequency locations between frequency locations of the received channel feedback metrics. For example, the BS may perform vector-based interpolation of channel directions. Alternatively, the BS may perform per-element interpolation for vectors or matrices by interpolating each element of the vector or matrix independently.

According to certain aspects, the BS may transmit signaling to the UE indicating a granularity of the frequency locations. The signaling may indicate different granularities for different transmission points. The signaling may be based on the frequency selectivity across a range of the frequency locations or long-term channel strength of a cell of the BS.

Figure 9:
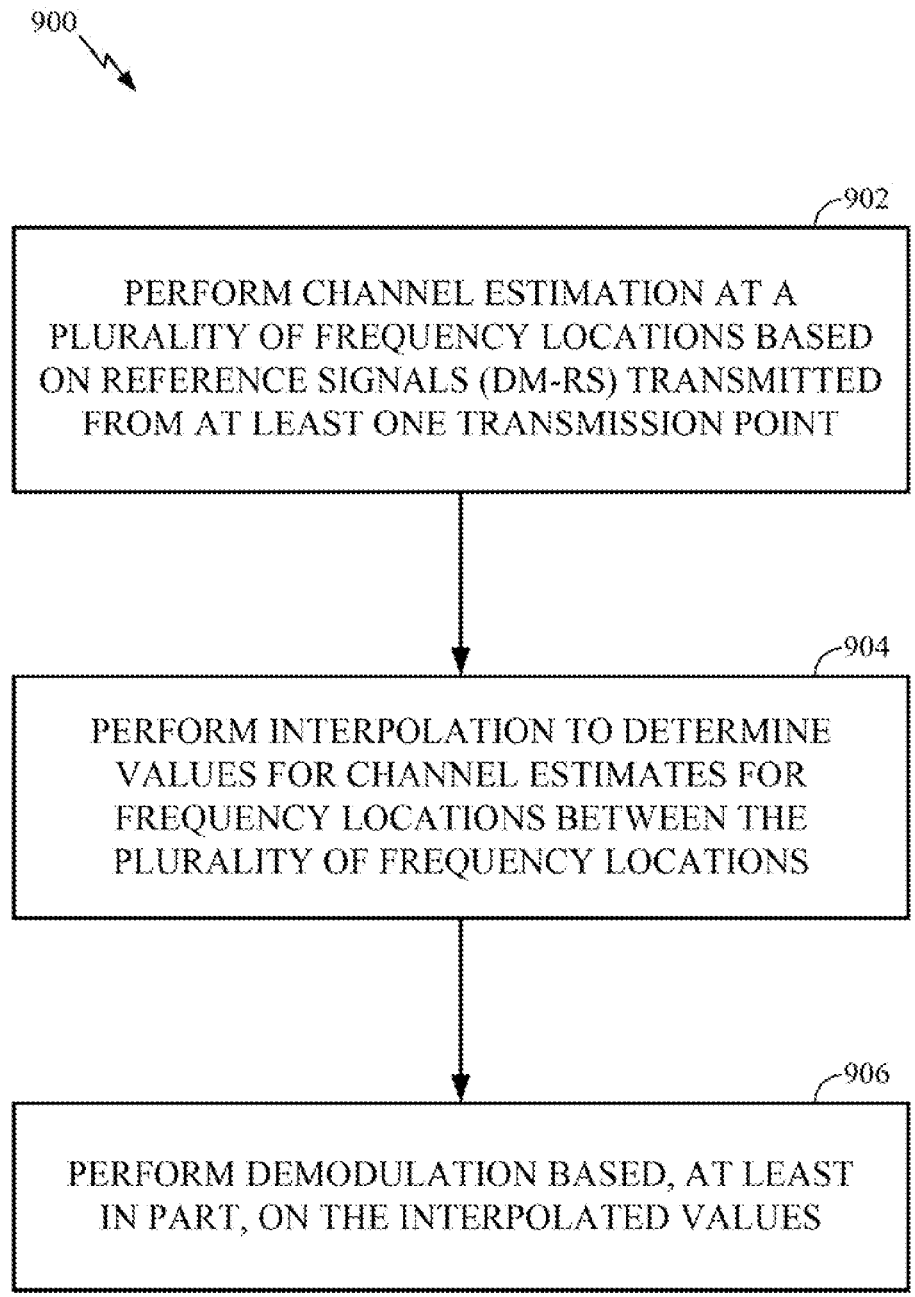
FIG. 9 illustrates example operations that may be performed, for example, by a UE, in accordance with aspects of the present disclosure.

FIG. 9 illustrates example operations 900 for wireless communications, in accordance with certain aspects of the present disclosure. The operations 900 may be performed, for example, by a UE (e.g., UE 120). The operations 900 may begin, at 902, by performing channel estimation at a plurality of frequency location based on RSs transmitted from at least one transmission point. According to certain aspects, the frequency locations may correspond to REs used to transmit the DM-RS. For certain embodiments, the UE may estimate the channel per DM-RS frequency location without assuming bundling in which precoding is fixed across a PRG.

At 904, the UE may perform interpolation to determine values for channel estimates for frequency locations between the plurality of frequency locations. And at 906, the UE may perform demodulation based, at least in part, on the interpolated values.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the disclosure herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal Generally, where there are operations illustrated in Figures, those operations may have corresponding counterpart means-plus-function components with similar numbering.

In one or more exemplary designs, the functions described may be implemented in hardware, software, firmware or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a user equipment (UE), comprising:
    performing channel estimation at a plurality of frequency locations in a subframe based on reference signals (RSs) transmitted in the subframe from at least one transmission point to obtain a channel estimate for each of the plurality of frequency locations;
    computing at least one channel feedback metric for each frequency location based on the channel estimate for that frequency location; and
    transmitting the channel feedback metrics to the at least one transmission point.

2. The method of claim 1, wherein the frequency locations correspond to a resource element (REs) used to transmit one of the RSs.

3. The method of claim 1, further comprising filtering to remove errors in the channel estimation.

4. The method of claim 1, wherein the at least one channel feedback metric comprises at least one of a precoder matrix indicator (PMI) or a channel quality indicator (CQI) for each frequency location.

5. The method of claim 1, wherein the at least one channel feedback metric comprises a channel direction.

6. The method of claim 1, wherein the at least one channel feedback metrics comprise channel matrix elements calculated as part of the channel estimation.

7. The method of claim 1, wherein:
    the at least one transmission point comprises at least first and second transmission points; and
    the at least one channel feedback metric comprises inter-point amplitude and phase information for each of the first and second transmission points.

8. The method of claim 1, further comprising receiving signaling indicating a granularity of the frequency locations.

9. The method of claim 8, wherein the signaling indicates different granularities for different transmission points.

10. The method of claim 1, wherein:
    the channel feedback metrics are transmitted periodically; and
    the channel feedback metrics for different frequency locations are transmitted in different subframes.

11. The method of claim 1, wherein:
    the channel feedback metrics are transmitted aperiodically; and
    the channel feedback metrics for the plurality of frequency locations are provided in a single report.

12. A method for wireless communications by a user equipment (UE), comprising:
    receiving demodulation reference signals (DM-RSs) transmitted in a subframe from at least one transmission point at a plurality of frequency locations in the subframe;
    performing channel estimation based on the DM-RSs at at least two of the plurality of frequency location to obtain a value for a channel estimate for each of the at least two frequency locations;

performing interpolation based on the values for the channel estimates for the at least two frequency locations to determine values for channel estimates for frequency locations between the at least two frequency locations; and performing demodulation of one or more signals based, at least in part, on the values for the channel estimates for the frequency locations between the at least two frequency locations.

13. The method of claim 12, wherein each frequency location corresponds to a resource element (RE) used to transmit one of the DM-RSs.

14. The method of claim 12, wherein the performing channel estimation comprises estimating the channel per DM-RS frequency location without assuming bundling in which precoding is fixed across a physical resource block group.

15. An apparatus for wireless communications by a user equipment (UE), comprising:
at least one processor configured to:
perform channel estimation at a plurality of frequency locations in a subframe based on reference signals (RSs) transmitted in the subframe from at least one transmission point to obtain a channel estimate for each of the plurality of frequency locations;
compute at least one channel feedback metric for each frequency location based on the channel estimate for that frequency location; and
transmit the channel feedback metrics to the at least one transmission point; and
memory coupled with the at least one processor.

16. The apparatus of claim 15, wherein the frequency locations correspond to a resource element (RE) used to transmit one of the RSs.

17. The apparatus of claim 15, wherein the at least one processor is further configured to filter to remove errors in the channel estimation.

18. The apparatus of claim 15, wherein the at least one channel feedback metric comprises at least one of a precoder matrix indicator (PMI) or a channel quality indicator (CQI) for each frequency location.

19. The apparatus of claim 15, wherein the at least one channel feedback metric comprises a channel direction.

20. The apparatus of claim 15, wherein the at least one channel feedback metric comprises channel matrix elements calculated as part of the channel estimation.

21. The apparatus of claim 15, wherein:
the at least one transmission point comprises at least first and second transmission points; and
the at least one channel feedback metric comprises inter-point amplitude and phase information for each of the first and second transmission points.

22. The apparatus of claim 15, wherein the at least one processor is further configured to receive signaling indicating a granularity of the frequency locations.

23. The apparatus of claim 22, wherein the signaling indicates different granularities for different transmission points.

24. The apparatus of claim 15, wherein:
the channel feedback metrics are provided periodically; and
the channel feedback metrics for different frequency locations are transmitted in different subframes.

25. The apparatus of claim 15, wherein:
the channel feedback metrics are transmitted aperiodically; and
the channel feedback metrics for the plurality of frequency locations are provided in a single report.

26. An apparatus for wireless communications by a user equipment (UE), comprising:
at least one processor configured to:
receive demodulation reference signals (DM-RSs) transmitted in a subframe from at least one transmission point at a plurality of frequency locations in the subframe;
perform channel estimation based on the DM-RSs at at least two of the plurality of frequency locations to obtain a value for a channel estimate for each of the at least two frequency locations;
perform interpolation based on the values for the channel estimates for the at least two frequency locations to determine values for channel estimates for frequency locations between the at least two frequency locations; and
perform demodulation of one or more signals based, at least in part, on the values for the channel estimates for the frequency locations between the at least two frequency locations; and
memory coupled with the at least one processor.

27. The apparatus of claim 26, wherein each frequency location correspond to a resource element (RE) used to transmit one of the DM-RSs.

28. The apparatus of claim 26, wherein the at least one processor is configured to perform channel estimation by estimating the channel per DM-RS frequency location without assuming bundling in which precoding is fixed across a physical resource block group.

29. The method of claim 1, further comprising:
performing channel estimation at different frequency locations in different subframes.

30. The apparatus of claim 15, wherein the at least one processor is further configured to perform channel estimation at different frequency locations in different subframes.

* * * * *